US011308992B1

(12) United States Patent
Jo et al.

(10) Patent No.: US 11,308,992 B1
(45) Date of Patent: Apr. 19, 2022

(54) STORAGE MEDIUM READER PHYSICAL LOCATION ACCESS

(71) Applicant: Amazon Technologies, Inc., Seattle, WA (US)

(72) Inventors: Keun Soo Jo, Bellevue, WA (US); Munif M. Farhan, Bellevue, WA (US); Andrew Kent Warfield, Vancouver (CA); Seth W. Markle, Seattle, WA (US); Roey Rivnay, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/711,959

(22) Filed: Dec. 12, 2019

(51) Int. Cl.
*G11B 5/54* (2006.01)
*G11B 15/087* (2006.01)
*G11B 21/08* (2006.01)

(52) U.S. Cl.
CPC .......... *G11B 21/083* (2013.01); *G11B 21/086* (2013.01)

(58) Field of Classification Search
CPC .. G11B 27/36; G11B 5/09; G11B 5/00; G11B 5/59633; G11B 5/59627; G11B 20/54; G11B 5/588; G11B 20/12; G11B 20/10; G11B 5/552; G11B 5/556; G11B 5/54; G11B 15/087
USPC ............. 360/48, 31, 39, 53, 72.1, 73.11, 75, 360/77.06, 78.05; 711/111, 112
See application file for complete search history.

(56) References Cited

U.S. PATENT DOCUMENTS

| 6,078,998 | A  | * | 6/2000 | Kamel ..................... | G06F 3/061 348/E5.008 |
| 6,763,430 | B1 | * | 7/2004 | Camp ..................... | G06F 3/0607 711/112 |
| 6,873,577 | B1 | * | 3/2005 | Mahr .................. | G11B 7/08529 369/30.17 |
| 6,880,040 | B2 | * | 4/2005 | Basham ................ | G06F 3/0601 398/49 |
| 6,915,376 | B1 | * | 7/2005 | Coulson .............. | G11B 5/5547 711/112 |
| 8,345,375 | B2 | * | 1/2013 | Ichimura .............. | G11B 17/225 360/92.1 |
| 8,958,172 | B1 | * | 2/2015 | Hansen ................ | G11B 25/043 360/98.01 |
| 9,268,676 | B2 | * | 2/2016 | Shiratori ............... | G06F 3/0629 |
| 2004/0003171 | A1 | * | 1/2004 | Basham ................ | G06F 3/0601 711/111 |

(Continued)

*Primary Examiner* — Nabil Z Hindi
(74) *Attorney, Agent, or Firm* — Klarquist Sparkman, LLP

(57) ABSTRACT

Technologies are provided for accessing a physical location of a storage medium reader of a storage device. A computing device can transmit a request for the storage medium reader's physical location. The storage device can determine the physical location of the storage medium reader and transmit the location to the computing device. The computing device can use the physical location of the storage medium reader to determine an expected latency for retrieving one or more stored data items. The computing device can transmit a command to change the physical location of the storage medium reader, for example by changing a location of the storage medium reader with respect to a given storage medium and/or changing a storage medium that is accessed by the storage medium reader. The computing device can control the placement of the storage medium reader in order to optimize retrieval of data items from the storage device.

17 Claims, 7 Drawing Sheets

(56) References Cited

U.S. PATENT DOCUMENTS

2016/0254026 A1* 9/2016 Katagiri .............. G11B 20/10
360/48

* cited by examiner

STORAGE MEDIUM READER PHYSICAL LOCATION ACCESS

BACKGROUND

At least some storage devices contain storage medium readers, with which one or more storage media can be read. In at least some such storage devices, such as hard disc drives, tape drives, and optical drives, a position of a storage medium reader can change with respect to a given storage medium. At least some storage devices are capable of accessing multiple storage media, such as a plurality of hard discs, a plurality of magnetic tapes, and/or a plurality of optical discs.

DETAILED DESCRIPTION

Figure 1:
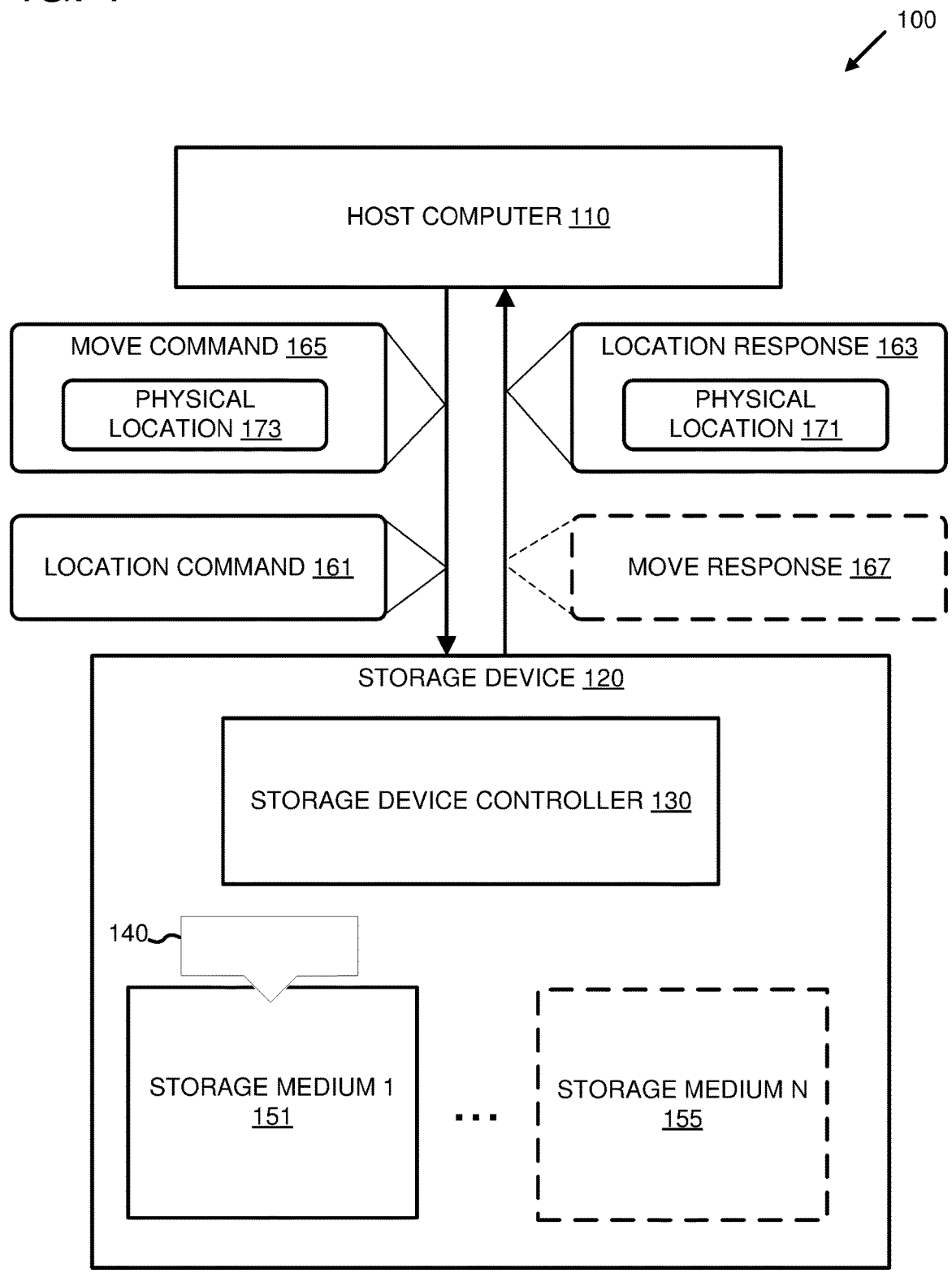
FIG. 1 is a system diagram depicting an example system for accessing a physical location of a storage medium reader of a storage device.

At least some storage devices have inherent data access latencies due to the time it takes to physically move storage medium readers of the storage devices. Often, to access a storage location of a storage medium, a storage medium reader of a storage device must be physically moved. This introduces latency to data access operations. Moreover, the impact of this latency is often unpredictable because a computing device connected to such a storage device does not know the current physical location of the storage device's storage medium reader.

At least some of the technologies described herein can be used to address these problems. For example, a storage device can be configured to determine a physical location of a storage medium reader and transmit the storage medium reader's physical location to a computing device, such as a host computer. The storage device can transmit the physical location periodically, or when the storage medium reader is moved. Additionally or alternatively, the computing device can be configured to transmit a request for the storage medium reader's physical location to the storage device. The computing device can be configured to use the physical location of the storage medium reader to determine an expected latency for retrieving one or more data items from the storage device. In at least some embodiments, the computing device can order data access commands that it transmits to the storage device based on the physical location of the storage medium reader. For example, the computing device can prioritize transmissions of data access commands for data items that are closer to the current physical location of the storage medium reader.

In a different or further embodiment, the computing device can be configured to transmit a command to the storage device to change the physical location of the storage medium reader. Such a command can comprise a command to change a physical location of the storage medium reader with respect to a given storage medium and/or to change a storage medium that is accessed by the storage medium reader. In at least some embodiments, the computing device can be configured to control the placement of the storage medium reader in order to optimize the retrieval of data items from the storage device. For example, the computing device can change the placement of the storage medium reader based on the contents of a data access request queue.

In a different or further embodiment, the computing device can be configured to determine the physical locations of storage medium readers of multiple storage devices where one or more data items are stored redundantly. The computing device can determine expected latencies for retrieving the one or more data items from the multiple storage devices based on the physical locations of the storage medium readers. Based on the expected latencies, the computing device can select one of the multiple storage devices to use to retrieve the one or more data items.

In a different or further embodiment, a storage device can be configured to fail a data access request if an expected latency of fulfilling the request would exceed a specified threshold. For example, the storage device can be configured to receive a data access command identifying a data item (such as a logical block address). The storage device can determine a physical location of a storage medium reader and determine an expected latency of moving the storage medium reader from its current location to another physical location where the data item is stored. The storage device can also consider a latency of reading the data item from a storage medium once the storage medium reader has been moved. If the expected latency exceeds the specified threshold, the storage device can transmit a response indicating that fulfilling the data access command would exceed the specified latency threshold.

In at least some such embodiments, a computing device can be configured to transmit data access commands to multiple storage devices, wherein the multiple storage devices are configured to fail (e.g., reject) the data access requests if they exceed the specified latency threshold. In such an embodiment, the computing device can transmit data access commands for a same data item to multiple storage devices without creating excessive amounts of extra work since the storage devices can reject the data access commands if fulfilling them would take too much time.

FIG. 1 is a system diagram depicting an example system 100 for accessing a physical location of a storage medium reader 140 of a storage device 120. The example system 100 comprises a host computer 110 configured to transmit a location command 161 to the storage device 120. The storage device 120 comprises a storage device controller 130, the storage medium reader 140, and one or more storage media 151-155. The storage device controller 130 is configured to receive the location command 161 and to transmit a response 163, indicating a physical location 171 of the storage medium reader 140, to the host computer 110. The physical location 171 can be a physical location of the storage medium reader with respect to one of the one or more storage media (e.g., 151). Additionally or alternatively, the physical location can indicate a location of the storage medium reader relative to the plurality of storage media 151-155.

The host computer is configured to receive the location response 163 from the storage device 120. In at least some embodiments, the host computer is configured to determine an expected latency for retrieving the data item using the storage medium reader 140 based on the physical location 171 of the storage medium reader 140. For example, the host computer 110 can use the physical location 171 to determine an estimated travel time of the storage medium reader 140 to reach a physical location on one or more of the storage media 151-155 where all or part of the data item is stored. The host computer 110 can use this estimated travel time and an estimated read time to retrieve the data item using the storage medium reader 140 to determine an overall estimated latency for retrieving the data item from the storage device 120. In at least some such embodiments, the host computer 110 can use the expected latency to prioritize a data access command to retrieve the data item relative to data access commands to retrieve other data items from the storage device 120.

The host computer 110 is further configured to transmit a move command 165 to the storage device 120. The move command 165 comprises a physical location 173 to which the storage medium reader 140 should be moved. The storage device controller 130 is configured to receive the move command 165 and to update the physical location of the storage medium reader 140 based on the physical location 173 indicated in the move command 165. Optionally, the storage device controller 130 can transmit a move response 167 to host computer 110, indicating that the storage medium reader 140 has been moved to the physical location 173.

In at least some embodiments where the storage device 120 comprises a plurality of storage media 151-155, updating the physical location of the storage medium reader 140 can comprise moving the storage medium reader from a first storage medium (e.g., 151) to a second storage medium (e.g., 155). For example, the plurality of storage media 151-155 can be associated with different physical locations from which the storage medium reader 140 can access the different storage media 151-155.

It is also possible for the plurality of storage media 151-155 to be storage media of different types. For example, the storage medium 151 can comprise a magnetic storage medium and the storage medium 155 can comprise an optical storage medium. Other configurations are also possible. In such embodiments, the storage medium reader 140 can comprise a plurality of media access assemblies. For example, the storage medium reader 140 can comprise a magnetic medium access assembly and an optical medium access assembly.

The host computer 110 can be configured to transmit the move command 165 to the storage device 120 to move the storage medium reader 140 to a physical location where a requested data item is stored. The host computer 110 can be configured to transmit a data access command to retrieve the data item to the storage device 120 after the storage medium reader 140 has move to the requested location. For example, the host computer 110 can determine that the data item is stored in the storage medium 155 and that the storage medium reader 140 is in a physical location to access the storage medium 151. The host computer 110 can transmit a move command to the storage device 120 to move the storage medium reader 140 to a physical location to access the storage medium 155. After the storage medium reader 140 has been moved, the host computer 110 can transmit one or more data access commands to the storage device 120 to retrieve the data item from the storage medium 155.

In any of the examples described herein, a storage device can be a device capable of storing data in one or more physical storage media. For example, the storage device can be a magnetic storage device, such as a hard disk drive or tape drive, that is capable of storing data in one or more magnetic recording formats. Other examples of storage devices include optical storage devices, flash storage devices (such as NAND-type flash devices and NOR-type flash devices), and random access data storage devices (such as DRAM devices). Further examples of storage devices include non-volatile dual in-line memory modules (NVDIMMs).

In some embodiments, the storage device comprises multiple storage media. For example, the storage device can be a hard disk drive that comprises a plurality of magnetic disks, a tape drive that can access a plurality of magnetic tape media, an optical drive that can access a plurality of optical media, a flash storage device that can access a plurality of flash media, etc. In at least some such embodiments, a storage device can comprise multiple disparate media, such as a storage device that comprises solid state storage and magnetic storage. In another example the storage device comprises multiple magnetic disks organized as a Redundant Array of Independent Disks (RAID). Other combinations of disparate storage media are also possible.

In any of the examples described herein, a storage medium reader comprises one or more components of a storage device configured to access one or more storage media. Example storage medium readers include hard drive actuator assemblies, magnetic tape drive access assemblies, optical disc access assemblies, etc. In at least some embodiments comprising a plurality of storage media, a storage medium reader can be moved from a physical location associated with one storage medium to another physical location associated with another storage medium. Additionally or alternatively, a storage device can comprise an assembly storing the plurality of storage media (such as a carousel, etc.) that can be moved to change the locations of the plurality of the storage media relative to the storage medium reader.

Although the term "storage medium reader" is used herein. The techniques described are not limited to reading data from a storage medium. At least some of the described techniques can apply to other forms of data access, such as writing data to a storage medium. In at least some embodiments, a storage medium reader and a storage medium writer can be part of a same data access assembly. For example, an actuator assembly can comprise an actuator arm with a read head and a write head. In such embodiments, a physical location of a storage medium reader can also be regarded as the physical location of a storage medium writer.

In any of the examples described herein, a storage device controller can comprise one or more hardware components of a storage device. The storage device controller can be configured to access a firmware stored in a read-only memory (ROM) of the device, a storage medium of the device, or some combination thereof. Additionally or alternatively, the storage device controller can be implemented at an intermediate layer between an application and the device. Such an intermediate layer controller can comprise software (such as a driver) and one or more processors, a system-on-chip (SoC), a field-programmable gate array (FPGA), and/or an application-specific integrated circuit (ASIC). In some embodiments, the storage device controller can be part of an application. In such an embodiment, the application may use the storage device controller to access a storage device directly, without using an intermediate layer, such as a driver. The storage device controller can be located on a computer containing the device, or on a separate computer that is connected to the device via a communication channel, such as a computer network.

In any of the examples described herein, a logical address comprises an identifier associated with one or more data items, such as a data block (or block of data). A data block can be a sequence of data units, such as bytes, bits, etc., that has a fixed size (sometimes referred to as a "block size"). In a storage device that supports data blocks, data is read from and/or written to the storage device one block at a time. A data block can have a physical address that identifies a position where it is stored in the storage device and a logical address, such as a logical block address (LBA), which is used by external components to identify and access the data block. By using logical addresses, the physical storage locations of data blocks in the storage device can change without having to notify or update any external components.

In any of the examples described herein, a host computer can be a server or other computing device that comprises a processor and is connected to a storage device. The host computer is connected to the storage device and is configured to transmit commands, such as processing commands, communication commands, data access commands (i.e., commands to perform data read and write operations), inquiry commands, firmware update commands, or the like, to the device. The host computer can be configured to receive command responses from the device. The connection can be a direct connection, such as a cable or bus connection, an indirect connection, such as a connection over a network, or some combination thereof. In scenarios where the host computer is connected to more than one device, the various connections can be of the same type or different types.

In some embodiments, the host computer can comprise a controller connected to multiple devices. In at least some embodiments, the host computer can be a computing device configured to provide a unified access point for multiple connected storage devices, such as a JBOD ("just a bunch of drives/disks") device, a RAID array controller, etc.

Figure 2:
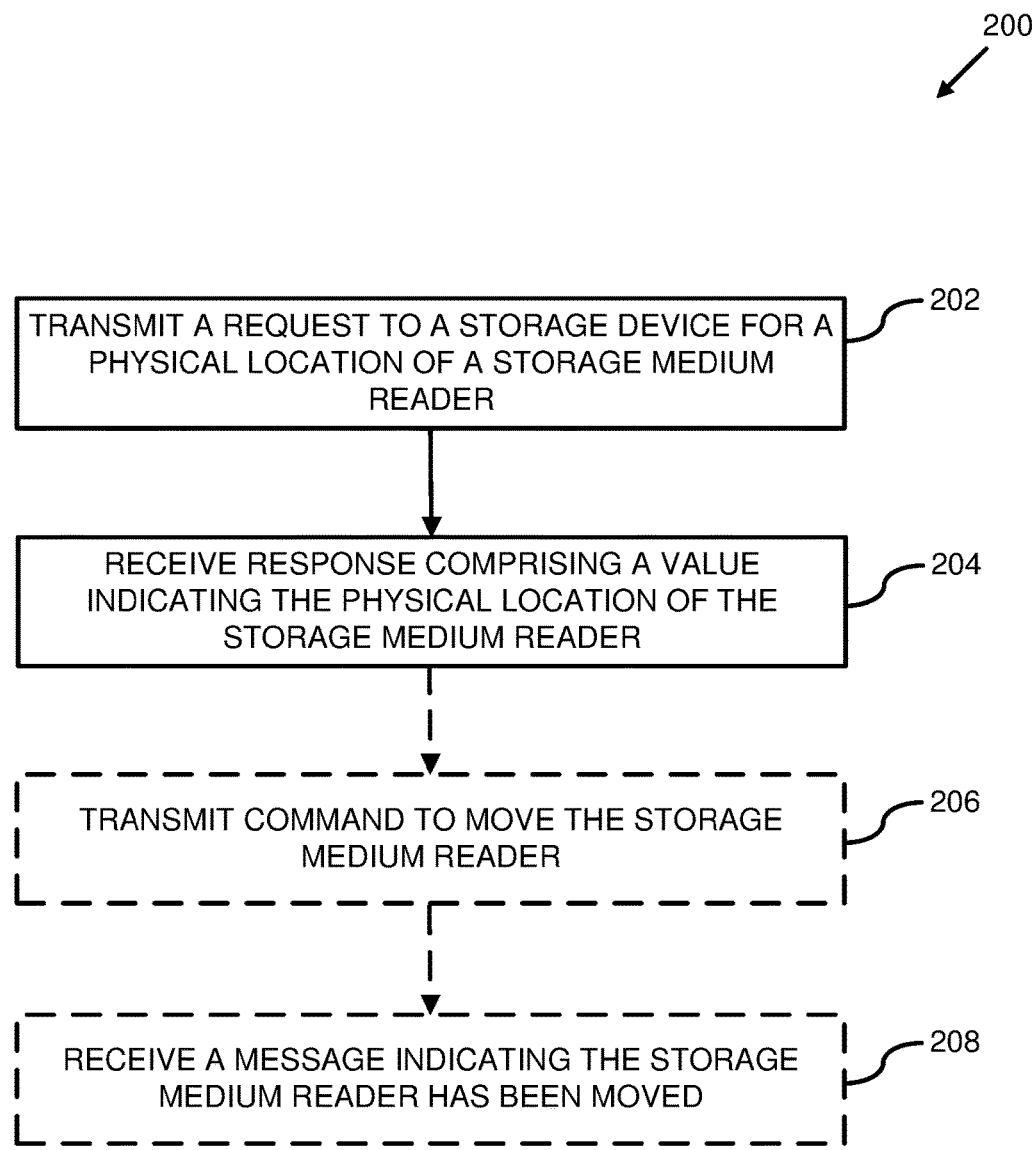
FIG. 2 is flowchart of an example method for accessing a physical location of a storage medium reader of a storage device.

FIG. 2 is flowchart of an example method 200 for accessing a physical location of a storage medium reader within a storage device. In at least some embodiments, the example method 200 can be performed by a computing device (such as a host computer) connected to a storage device. Any of the example systems and devices described herein can be used to perform all or part of the example method 200. For example, the example system 100 can be used to perform all or part of the example method 200. For example, the example system 500 depicted in FIG. 5 can be used to perform all or part of the example method 200.

At 202, a request is transmitted to a storage device for a physical location of a storage medium reader within the storage device. For example, referring to FIG. 1, the host computer 110 can transmit the location command 161 to the storage device 120.

The request can be transmitted via one or more wired and/or wireless connections. The request can be a request that is transmitted from a host computer to the storage device on demand. Additionally or alternatively, the host computer can transmit requests for the location of the storage medium reader periodically.

At 204, a response is received from the storage device that comprises a value indicating the physical location of the storage medium reader within the storage device. For example, referring to FIG. 1, the host computer 110 can receive the location response 163 comprising the physical location 171 from the storage device 120. In at least some embodiments, the request can comprise an operational status request. In such an embodiment, the physical location of the storage medium reader can be one of a plurality of operational status items requested from the storage device. Example operational status items include durability and/or endurance of one or more storage media, power consumption of the storage device, etc.

Optionally, at 206, a command is transmitted to move the storage medium reader. In at least some embodiments, the command comprises a value indicating another physical location. For example, referring to FIG. 1, the host computer 110 can transmit the move command 165, comprising the physical location 173, to the storage device 120.

In at least some embodiments, the storage device can comprise a plurality of storage media. In such an embodiment, transmitting the command to move the storage medium reader comprises transmitting a command to switch the storage medium reader from accessing one storage medium to accessing another storage medium. For example, the plurality of storage media can be associated with different physical locations at which the storage medium reader can access the storage media respectively. The host computer can be configured to transmit an identifier of one of the physical locations associated with one of the plurality of storage media as part of the command to move the storage medium reader. Additionally or alternatively, the different storage media can be associated with identifiers which the storage device associates with physical locations from which the storage media can be accessed by the storage medium reader. In such an embodiment, the command to move the storage medium reader can comprise an identifier associated with one of the plurality of storage media.

Optionally, at 208, a message is received from the storage device, indicating that the storage medium reader has been moved. In at least some embodiments, the storage device can be configured to transmit the message subsequent to changing a physical location of the storage medium reader. Additionally or alternatively, messages indicating the physical location of the storage medium reader can be transmitted periodically by the storage device. In at least some embodiments, the storage device transmits the message as a response to a command to move the storage medium reader. For example, referring to FIG. 1, the host computer 110 can receive the move response 167 from the storage device 120.

Figure 3:
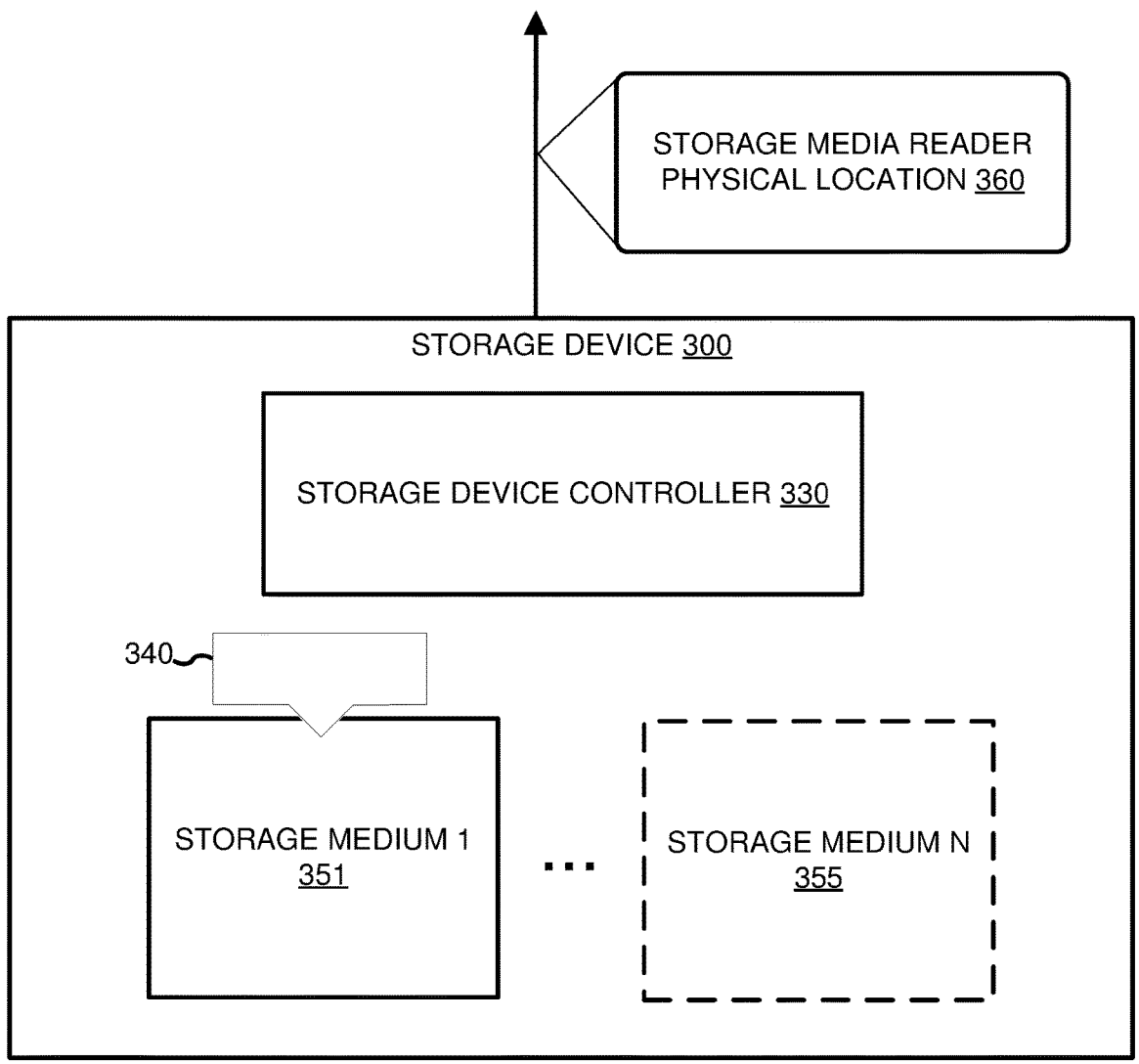
FIG. 3 is a diagram depicting an example storage device configured to determine and transmit a physical location of a storage medium reader of the storage device.

FIG. 3 is a diagram depicting an example storage device 300 configured to determine and transmit a physical location of a storage medium reader 340 of the storage device 300. The storage device 300 comprises a storage device controller 330, the storage medium reader 340, and one or more storage media 351-355.

The storage device controller 330 is configured to determine a physical location of the storage medium reader 340 and to transmit the physical location 360 of the storage medium reader 340 via one or more wired and/or wireless connections of the storage device 300. In at least some embodiments, the physical location 360 of the storage medium reader 340 can be transmitted to a computing device (not shown) connected to the storage device 300. In at least some embodiments, the storage device controller 330 is configured to receive a request (not shown) for the physical location of the storage medium reader 340 from the computing device. In such an embodiment, the physical location 360 can be transmitted responsive to receiving the request from the computing device. The request can be a request for the physical location of the storage medium reader 340. Additionally or alternatively, the request can be a request for an operational status of the storage device 340. In such an embodiment, the physical location of the storage medium reader 340 can be one of a plurality of operational status values transmitted in the response.

Additionally or alternatively, the storage device 300 can be configured to transmit the physical location 360 of the storage medium reader 340 when the physical location of the storage medium reader 340 has changed. Additionally or alternatively, the storage device 300 can be configured to periodically transmit the physical location of the storage medium reader 340.

The storage device 300 can be configured to change the physical location of the storage medium reader 340 responsive to receipt of a command. For example, the storage device controller 330 can be configured to receive a command from a computing device to change a physical location of the storage medium reader 340. The command can comprise an identifier indicating a new physical location to which the storage medium reader should be moved. In an embodiment where a plurality of storage media 351-355 are accessible using the storage medium reader 340, changing the physical location of the storage medium reader 340 can comprise moving the storage medium reader from one storage medium to another storage medium.

In at least some embodiments, the storage device controller 330 can be configured to determine an expected latency to access a storage location of a storage medium (e.g., 351) based on the physical location of the storage medium reader 340. For example, the storage device controller 330 can determine an expected amount of time that it will take for the storage medium reader 340 to travel from its current physical location to another physical location where the storage location can be accessed. In some scenarios, the contents of a data access command queue of the storage device 300 can be considered in determining the expected latency. For example, a relative priority of a command to access the storage location with respect to other commands in the command queue can be considered to determine an additional latency to access the storage location.

In some embodiments, the storage device controller 330 can use the expected latency to determine whether or not to fail a data access command to access the storage location. For example, if the expected latency to access the storage location exceeds a specified threshold then the storage device controller 330 can transmit a failure response, indicating that the storage location could not be accessed within the specified time requirements. The threshold can be defined in a firmware of the storage device. In at least some embodiments, the threshold can be provided to the storage device by a computing device connected to the storage device during an initialization of the storage device. Additionally or alternatively, the threshold can be specified as part of the data access command. For example, a data access command can be provided which identifies a data item to be retrieved from storage device and a latency threshold. If, given the current physical location of the storage medium reader, an expected latency to access a storage location where the data item is stored would exceed the latency threshold, then the storage device can fail the data access command instead of retrieving the data item.

Figure 4:
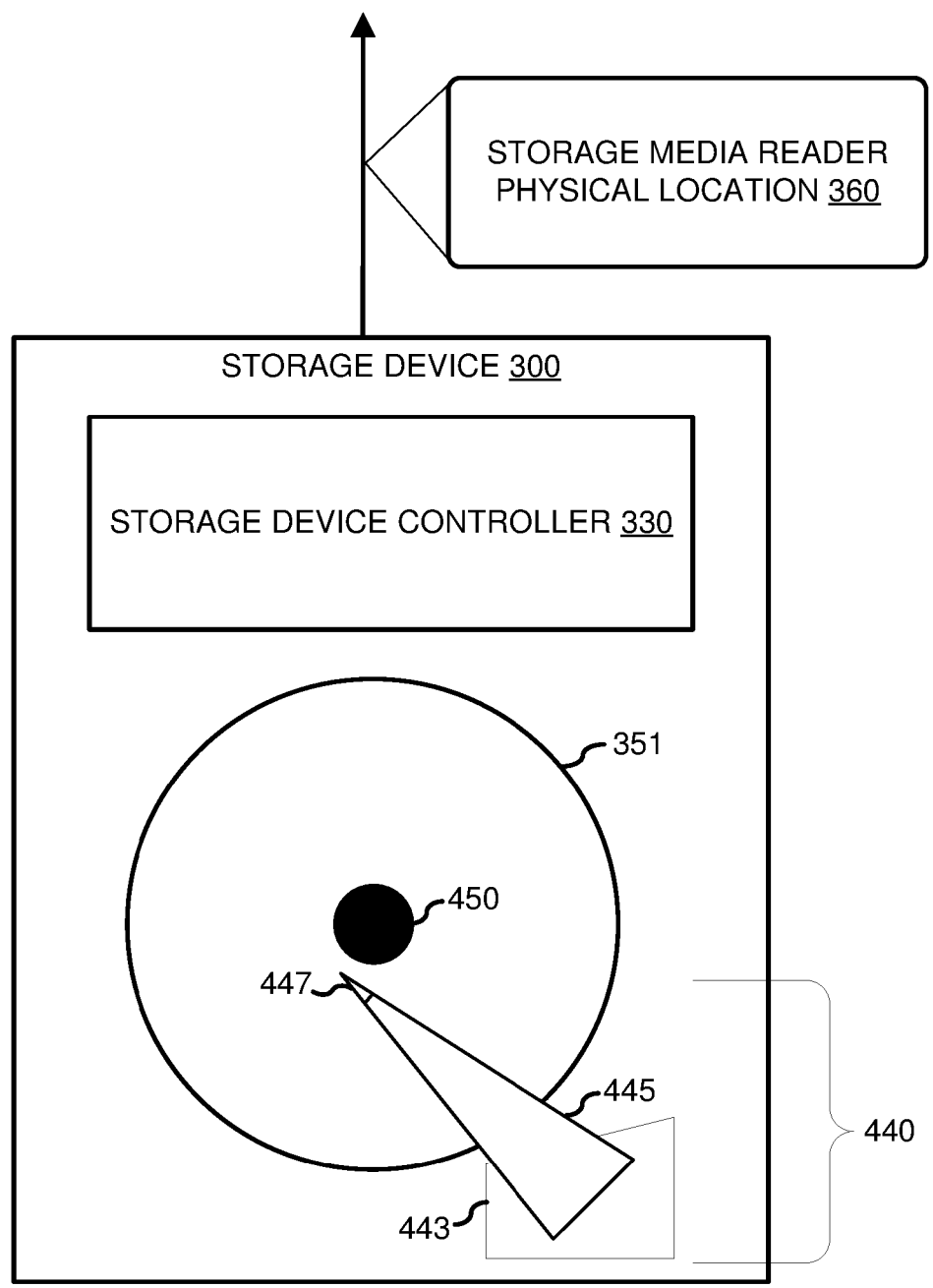
FIG. 4 is a diagram depicting an example storage device comprising a storage medium reader configured to access a magnetic storage medium.

FIG. 4 is a diagram depicting the example storage device 300, wherein the storage medium 351 is a magnetic storage medium and the storage medium reader 340 comprises an actuator arm assembly 440.

The storage device controller 330 can be configured to rotate the storage medium 351 on a spindle 450 and to perform data read operations on the storage medium 351 via a moveable actuator arm 445. The actuator arm 445 can comprise a read/write head 447. The actuator arm 445 can be rotated on an actuator axis (not shown) by an actuator 443 to move the read/write head 447 over different portions of the storage medium 351. The storage device controller 330 can be configured to read data from the storage medium 351 using the read/write head 447. The read/write head 447 can comprise a single head that can perform both read and write operations. Alternatively, the read/write head 447 can comprise two separate heads for reading and writing, respectively. In at least some embodiments, the head 447 can comprise a read head without a write head. In at least some other embodiments, the storage device controller 330 can be configured to use the read/write head 447 to write data to the storage medium 351 in multiple concentric circular tracks as the storage medium is rotated on the spindle 149.

The physical location 360 of the storage medium reader 440 can comprise a physical location of the read/write head 447 and/or the physical location of the actuator arm 445. The storage device controller 330 can be configured to receive a command to change the location of the storage medium reader 440 that comprises an identifier indicating a physical location to which the read/write head 447 should be moved and/or a physical location to which the actuator arm 445 should be moved.

Other examples of storage medium reader assemblies are also possible. For example the storage medium reader can comprise an assembly for reading the magnetic tape storage medium. For example, the storage device 300 can comprise a magnetic tape storage medium and the storage medium reader can comprise a magnetic read head configured to read data from magnetic tape. In such an embodiment, the storage medium reader can further comprise an assembly for advancing and rewinding the magnetic tape, and/or an assembly for loading and ejecting a plurality of magnetic tapes.

In another example, the storage medium reader can comprise an assembly for accessing optical storage media. For example, the storage medium reader can comprise a moveable laser assembly for reading data from and optical disc. In at least some embodiments, the storage medium reader can further comprise an assembly for loading and unloading a plurality of optical disks.

Figure 5:
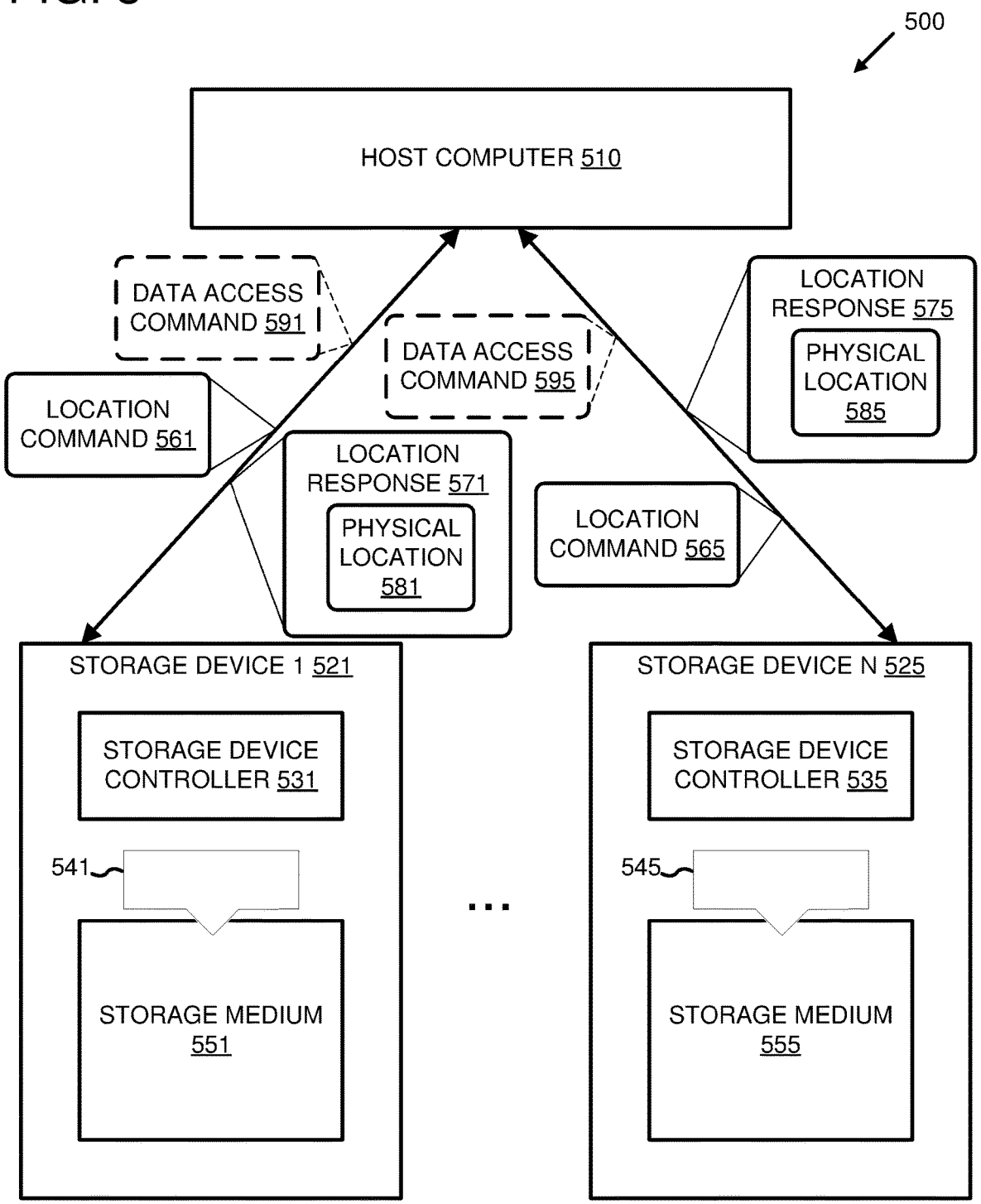
FIG. 5 is a diagram depicting an example system comprising a host computer connected to a plurality of storage devices.

FIG. 5 is a system diagram depicting an example system 500 comprising a host computer 510 connected to a plurality of storage devices 521-525. Although two storage devices are depicted, other numbers of storage devices are possible. The plurality of storage devices 521-525 comprise storage device controller's 531-535, storage medium readers 541-545 and storage media 551-555. Although not depicted, it is possible for one or more of the storage devices 521-525 to comprise more than one storage medium. In such an embodiment, a physical location of a storage medium reader (e.g., 541 or 545) can comprise a physical position from which the given storage medium reader can access a particular storage medium.

The host computer 510 is configured to transmit location commands 561-565 to the storage devices 521-525, requesting the physical locations of the respective storage medium readers 541-545 of the storage devices 521-525. The storage devices 521-525 can transmit location responses 571-575 to the host computer 510, indicating current physical locations 581-585 of the respective storage medium readers 541-545. In at least some embodiments, the host computer 510 can determine an expected latency for retrieving a given data item from each of the storage devices 521-525 based on the physical locations 581-585 of the storage medium readers 541-545. The host computer 510 can then select one of the storage devices to use in retrieving the data item. For example, the host computer 510 can determine, based on the physical locations 581-585 of the storage medium readers 541-545 that an expected latency for retrieving a data item from the storage device 521 is less than an expected latency for retrieving the data item from the storage device 525. The host computer 510 can then use the storage device 521 to retrieve the data item instead of the storage device 525. For example, the host computer 510 can transmit a data access command 591 to the storage device 521 to retrieve the data item. Alternatively, if the host computer 510 determines that the expected latency for the storage device 525 is less than the expected latency for the storage device 521, the host computer can use the storage device 525 to retrieve the data item instead of using the storage device 521. For example, the host computer 510 can transmit a data access command 595 to the storage device 525.

In at least some embodiments, the host computer 510 can transmit data access commands to multiple storage devices, of the storage devices 521-525. For example, the host computer 510 can identify a plurality of storage devices which have expected latency is for retrieving a given data item that are below a specified threshold. The host computer 510 can transmit data access commands (e.g., 591 and 595, etc.) to the identified plurality of storage devices. The host computer 510 can be configured to use the data item that is returned first, and to disregard responses from the other identified storage devices.

Additionally or alternatively, the storage devices 521-525 can be configured to determine expected latencies for processing a data access commands. For example, the storage device controller (e.g., 531) can be configured to determine an expected latency for moving the storage medium reader (e.g., 541) from its current position to a position where data for a given data access command can be read. The storage device controller (e.g., 531) can be configured to reject the data access command if the expected latency exceeds a specified threshold. In such an embodiment, the host computer 510 can be configured to transmit a plurality of data access commands (e.g., 591 and 595) to a plurality of the storage devices 521-525 to retrieve a same data item. Storage devices, of the plurality of storage devices, for which retrieving the data item would exceed an acceptable latency, can reject the data access command while one or more of the plurality of storage devices where the latency does not exceed the acceptable threshold can process the command and return the data item to the host computer 510.

Figure 6:
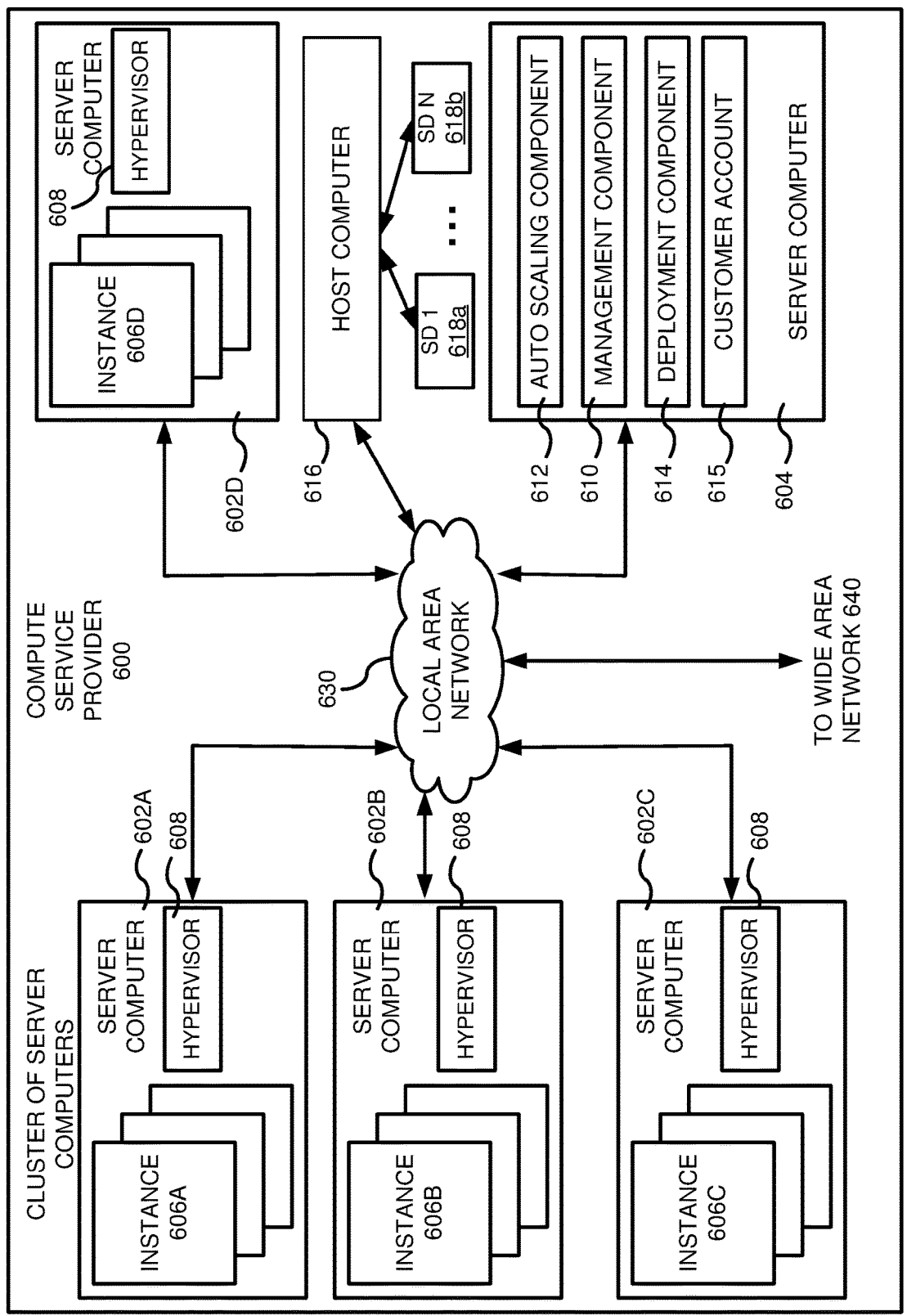
FIG. 6 is an example system diagram depicting a plurality of virtual machine instances running in a multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example, each of the servers 602A-602D can be configured to execute a hypervisor 608 or another type of program configured to enable the execution of multiple instances 606 on a single server. For example, each of the servers 602A-602D can be configured (e.g., via the hypervisor 608) to support one or more virtual machine slots, with each virtual machine slot capable of running a virtual machine instance (e.g., server computer 602A could be configured to support three virtual machine slots each running a corresponding virtual machine instance). Additionally, each of the instances 606 can be configured to execute one or more applications.

It should be appreciated that, although the embodiments disclosed herein with respect to compute service provider 600 are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can comprise Clos networks or other types of multi-tiered network fabrics. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and network devices can be utilized to interconnect the various computing systems disclosed herein.

A host computer 616 can be included in the compute service provider 600 to perform storage device access operations as described herein. For example, the host computer 616 can be connected to one or more storage devices 618a-b. The host computer 616 can be configured to determine physical locations of storage medium readers (not shown) of the storage devices 618. For example, the host computer 616 can transmit one or more location commands to one or more of the storage devices 618 and can receive one or more physical locations of storage medium readers of the storage devices in response. In at least some embodiments, the host computer 616 can determine expected latencies of retrieving one or more data items from one or more of the storage devices 618 based on the physical locations of the storage medium readers. Based on the expected latencies, the host computer 616 can transmit one or more data access commands to one or more of the storage devices 618. Additionally or alternatively, the host computer can transmit data access commands to retrieve a same data item to a plurality of the storage devices 618. In at least some such embodiments, the host computer 616 can access the one or more storage devices 618 in response to receiving a data access request from one or more of the instances 606.

Although the host computer 616 is depicted in FIG. 6 as separate from the server computers 602, in some embodiments, the host computer 616 can comprise one or more components of one or more of the server computers 602. For example, the host computer 616 can be a part of one or more of the instances 606.

Figure 7:
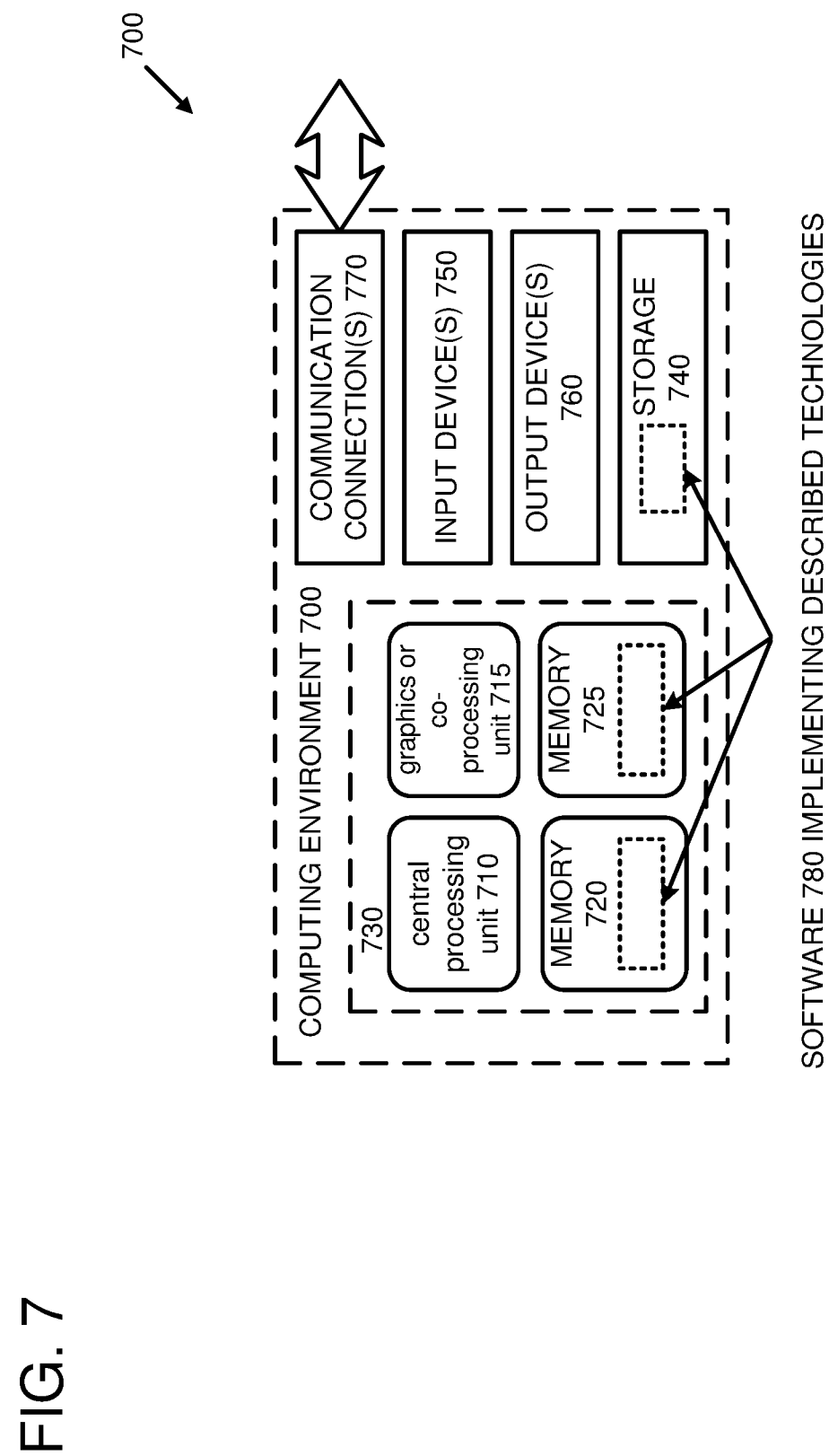
FIG. 7 is a diagram depicting a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 can store software 780 implementing one or more innovations described herein, (for example, in the form of computer-executable instructions suitable for execution by the processing unit(s)). In at least some embodiments, the computing environment 700 can comprise a computing device or host computer as described herein.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 can store instructions for the software 780 implementing one or more innovations described herein (for example in a storage medium and/or firmware of the storage 740). In at least some embodiments, the tangible storage 740 can comprise one or more storage devices as described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-Specific Integrated Circuits (ASICs), Program-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system, comprising:
a host computer configured to:
transmit, to a storage device, a first command requesting a current physical location of a storage medium reader of the storage device with respect to a storage medium,
receive a response from the storage device, comprising the current physical location of the storage medium reader of the storage device with respect to the storage medium, and
determine an expected latency for retrieving a data item using the storage medium reader of the storage device based on the current physical location of the storage medium reader;
transmit, to the storage device, a second command requesting a change to the physical location of the storage medium reader of the storage device; and
the storage device, wherein the storage device comprises a storage device controller configured to:
receive the first command from the host computer,
transmit the response, comprising the current physical location of the storage medium reader with respect to the storage medium, to the host computer,
receive the second command, and
update the physical location of the storage medium reader based on the second command.

2. The system of claim 1, wherein:
the storage device comprises a plurality of storage media; and
updating the physical location of the storage medium reader comprises moving the storage medium reader from a first storage medium, of the plurality of storage media, to a second storage medium, of the plurality of storage media.

3. The system of claim 2, wherein the first storage medium and the second storage medium are different types of storage media.

4. The system of claim 1, wherein:
the storage device is a first storage device and the expected latency is a first expected latency;
the system further comprises a second storage device; and
the host computer is further configured to:
determine that a second expected latency for retrieving the data item using a storage medium reader of the second storage device based on a physical location of the storage medium reader of the second storage device is less than the first expected latency, and
use the second storage device to retrieve the data item instead of the first storage device.

5. A method comprising:
transmitting a request to a storage device for a current physical location of a storage medium reader within the storage device;
receiving a response from the storage device comprising a value indicating the current physical location of the storage medium reader within the storage device; and
prioritizing a transmission of a data access command based on the current physical location of the storage medium reader within the storage device, wherein the prioritizing the transmission of the data access command comprises determining a latency of retrieving a data item using the storage device based on the current physical location of the storage medium reader.

6. The method of claim 5, wherein transmitting the request to the storage device comprises transmitting an operational status request to the storage device.

7. The method of claim 5, further comprising:
determining another latency of retrieving the data item using another storage device based on a physical location of a storage medium reader of the other storage device; and
selecting the storage device or the another storage device to use to retrieve the data item based on the determined latencies.

8. The method of claim 5, further comprising:
transmitting a command to the storage device comprising a value indicating another physical location; and
receiving a response from the storage device, indicating that the storage medium reader has been moved to the another physical location.

9. The method of claim 8, wherein the transmitting the command to the storage device comprises transmitting a command to switch the storage medium reader from accessing one storage medium to accessing another storage medium.

10. The method of claim 9, wherein the command comprises a storage medium identifier associated with the another storage medium.

11. A storage device comprising a storage medium reader and a storage device controller, wherein the storage device controller is configured to:
determine an expected latency to access a storage location of a storage medium based on a physical location of the storage medium reader;
transmit the expected latency to a computing device connected to the storage device;
determine a current physical location of the storage medium reader with respect to the storage medium; and
transmit the current physical location of the storage medium reader with respect to the storage medium to the computing device.

12. The storage device of claim 11, wherein the storage device controller is further configured to:
receive a request for the current physical location of the storage medium reader from the computing device; and
transmit the current physical location of the storage medium reader to the computing device responsive to receiving the request.

13. The storage device of claim 11, wherein the storage device controller is further configured to change a physical location of the storage medium reader responsive to a command from the computing device, wherein the command from the computing device is a command requesting a change to the physical location of the storage medium reader of the storage device.

14. The storage device of claim 11, wherein the physical location of the storage medium reader is transmitted as part of an operational status message.

15. The storage device of claim 11, wherein the storage device controller is further configured to:
receive a data access command from the computing device;
determine an expected latency of fulfilling the data access command based on the physical location of the storage medium reader;
determine that the expected latency exceeds a specified threshold; and
transmit a failure response to the computing device.

16. The storage device of claim 11, further comprising a plurality of storage media that are accessible using the storage medium reader.

17. The storage device of claim 11, wherein:
the storage device further comprises a magnetic disk storage medium; and
the storage medium reader comprises an actuator, an actuator arm, and a magnetic read head.

* * * * *